United States Patent [19]

Smith et al.

[11] 4,165,345

[45] Aug. 21, 1979

[54] HIGH SOLIDS COATING COMPOSITIONS

[75] Inventors: Oliver W. Smith, South Charleston; Joseph V. Koleske, Charleston, both of W. Va.

[73] Assignee: Union Carbide Corporation, New York, N.Y.

[21] Appl. No.: 898,103

[22] Filed: Apr. 20, 1978

Related U.S. Application Data

[62] Division of Ser. No. 690,185, May 26, 1976, Pat. No. 4,101,603.

[51] Int. Cl.$^2$ .................. C08L 61/32; C08L 67/04; C08G 18/64
[52] U.S. Cl. .................. 525/419; 260/33.4 R; 528/73; 528/80
[58] Field of Search .................. 260/849, 850; 528/73, 528/80

[56] References Cited

U.S. PATENT DOCUMENTS

| | | | |
|---|---|---|---|
| 3,267,174 | 8/1966 | Fry et al. | 260/851 |
| 3,408,421 | 10/1968 | Kurka | 260/830 TW |
| 3,668,178 | 6/1972 | Comstock et al. | 260/40 R |
| 3,857,817 | 12/1974 | Henshaw et al. | 260/849 |
| 3,928,265 | 12/1975 | Dhein et al. | 260/850 |
| 3,994,851 | 11/1976 | Chang | 260/850 |

*Primary Examiner*—John C. Bleutge
*Attorney, Agent, or Firm*—Francis M. Fazio

[57] ABSTRACT

High solids coating compositions comprising a polycaprolactone derivative and a mixture of a methylolated melamine and a low molecular weight polyol; and, optionally, solvent and catalyst. The polycaprolactone derivative used in the coating compositions is the reaction product of a polycaprolactone polyol, a polyisocyanate and an anhydride of a polycarboxylic acid; the polycaprolactone polyol has an average of at least two hydroxyl groups in the molecule, a hydroxyl number of from about 15 to about 600 and an average molecular weight of from about 290 to about 6,000. The carboxylic acid anhydride mentioned has at least one intramolecular carboxylic anhydride group. The polycaprolactone derivatives are water insoluble.

17 Claims, No Drawings

HIGH SOLIDS COATING COMPOSITIONS

This application is a division of Ser. No. 690,185, filed on May 26, 1976 now U.S. Pat. No. 4,101,603.

BACKGROUND OF THE INVENTION

Governmental regulations have placed ever increasing restrictions on the amounts and types of organic volatiles permitted to escape into the atmosphere from coatings compositions. Considerable efforts have been expanded to develop coatings compositions having a minimal amount of volatile organic components and this has led to development of powder coatings, radiation curable coatings, water borne coatings and high solids coatings. In these recent developments the amounts of organic solvents present are minimal and consequently there is little or no atmospheric pollution.

In the field of solvent coatings, efforts have been made to reduce the amount of volatile solvent present and to increase the amount of component that will remain as the coating on the substrate. At a sufficiently high concentration of such components one has what is known as a high solids coating composition. There are compositions that are applied in liquid form and dry to acceptable films without the evaporation of substantial quantities of solvents. Thus, a high solids coating composition, such as the ones hereinafter described, which would serve to lower atmospheric pollution and still produce a good satisfactory coating composition, would be of great importance.

SUMMARY OF THE INVENTION

It has now been found that certain polycaprolactone derivatives can be used in conjunction with methylolated melamines and certain low molecular weight polyols to produce high solids coating compositions. The polycaprolactone derivatives are hereinafter more fully defined and include (A) polycaprolactone polyols; (B) the reaction products obtained by reacting a polycaprolactone polyol and an anhydride of a polycarboxylic acid to produce a carboxyl modified polycaprolactone adduct which is generally water insoluble; or (C) the reaction products obtained by reacting a polycaprolactone polyol, a polyisocyanate and an anhydride of a polycarboxylic acid to produce a carboxyl modified polycaprolactone urethane adduct which is generally water insoluble; or (D) the reaction products obtained by reacting a polycaprolactone polyol, a diepoxide and an anhydride of a polycarboxylic acid to produce a carboxyl modified polycaprolactone-epoxide adduct which is generally water insoluble. The high solids coatings compositions can optionally contain an organic solvent and a catalyst, where necessary. The preferred compositions are those in which the methylolated amine is hexamethoxymethylmelamine. The high solids coatings are applied in conventional manner and thermally cured to dry films.

DESCRIPTION OF THE INVENTION

The polycaprolactone derivatives that are blended with the methylolated melamine and the low molecular weight polyol to produce the compositions of this invention are of four types, as hereinafter identified. Type A are any of the known polycaprolactone polyols that are commercially available and that are fully described, for example, in U.S. Pat. No. 3,169,945. As described in this patent the polycaprolactone polyols are produced by the catalytic polymerization of an excess of a caprolactone and an organic polyfunctional initiator having at least two reactive hydrogen atoms. The method for producing the polycaprolactone polyols is of no consequence and the organic functional initiators can be any polyhydroxyl compound as is shown in U.S. Pat. No. 3,169,945. Illustrative thereof are the diols such as ethylene glycol, diethylene glycol, triethylene glycol, 1,2-propylene glycol, dipropylene glycol, 1,3-propylene glycol, polyethylene glycol, polypropylene glycol, poly(oxyethylene-oxypropylene) glycols, and similar polyalkylene glycols, either blocked, capped or heteric, containing up to about 40 or more alkyleneoxy units in the molecule, 3 methyl-1-5-pentanediol, cyclohexanediol, 4,4'methylene-bis-cyclohexanol, 4,4'-isopropylidene biscyclohexanol, xylenediol, 2-(4-hydroxymethylphenyl) ethanol, 1,4 butanediol, and the like; triols such as glycerol, trimethylolpropane, 1,2,6-hexanetriol, triethanolamine, triisopropanolamine, and the like; tetrols such as erythritol, pentaerythritol, N,N,N',N'-tetrakis(2-hydroxyethyl)ethylene diamine, and the like.

When the organic functional initiator is reacted with the caprolactone a reaction occurs that can be represented in its simplest form by the equation:

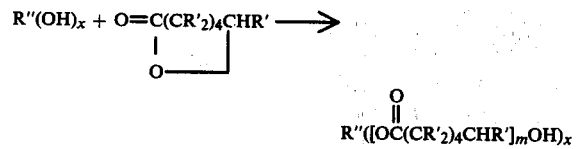

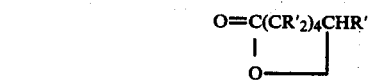

In this equation the organic functional initiator is the $R'''-(OH)_x$ compound and the caprolactone is the $$O=C(CR'_2)_4CHR'$$
$$\phantom{O=C(CR'_2)_4}|\phantom{CHR'}|$$
$$\phantom{O=C(CR'_2)_4}O\phantom{HR'}$$

compound; this can be caprolactone itself or a substituted caprolactone wherein R' is an alkyl, alkoxy, aryl, cycloalkyl, alkaryl or aralkyl group having up to twelve carbon atoms and wherein at least six of the R' groups are hydrogen atoms, as shown in U.S. Pat. No. 3,169,945. The polycaprolactone polyols that are used are shown by the formula on the right hand side of the equation; they can have an average molecular weight of from 290 to about 6,000. The preferred polycaprolactone polyol compounds are those having an average molecular weight of from about 290 to about 3,000, preferably from about 300 to 1,000. The most preferred are the polycaprolactone diol compounds having an average molecular weight of from about 290 to about 500 and the polycaprolactone triol compounds having an average molecular weight of from about 300 to about 1,000; these are most preferred because of their low viscosity properties. In the formula m is an integer representing the average number of repeating units needed to produce the compound having said molecular weights. The hydroxyl number of the polycaprolactone polyol can be from about 15 to 600, preferably from 200 to 500; and the polycaprolactone can have an average of from 2 to 6, preferably 2 to 4, hydroxyl groups.

Illustrative of Type A polycaprolactone polyols that can be used as in the compositions of this invention, and in the preparation of the Type B, Type C and Type D components used in the compositions of this invention, one can mention the reaction products of a polyhydroxyl compound having an average from 2 to 6 hydroxyl groups with caprolactone. The manner in which these type polycaprolactone polyols is produced is shown in U.S. Pat. No. 3,169,945 and many such compositions are commercially available. In the following table there are listed illustrative polycaprolactone polyols. The first column lists the organic functional initiator that is reacted with the caprolactone and the average molecular weight of the polycaprolactone polyol is shown in the second column. Knowing the molecular weights of the initiator and of the polycaprolactone polyol one can readily determine the average number of molecules of caprolactone (CPL Units) that reacted to produce the Type A compound; this figure is shown in the third column.

TYPE A POLYCAPROLACTONE POLYOLS

| | Initiator | Average MW of polyol | Average No. of CPL units in molecules |
|---|---|---|---|
| 1 | Ethylene glycol | 290 | 2 |
| 2 | Ethylene glycol | 803 | 6.5 |
| 3 | Ethylene glycol | 2,114 | 18 |
| 4 | Propylene glycol | 874 | 7 |
| 5 | Octylene glycol | 602 | 4 |
| 6 | Decalence glycol | 801 | 5.5 |
| 7 | Diethylene glycol | 527 | 3.7 |
| 8 | Diethylene glycol | 847 | 6.5 |
| 9 | Diethylene glycol | 1,246 | 10 |
| 10 | Diethylene glycol | 1,998 | 16.6 |
| 11 | Diethylen glycol | 3,526 | 30 |
| 12 | Triethylene glycol | 754 | 5.3 |
| 13 | Polyethylene glycol (MW 200)* | 713 | 4.5 |
| 14 | Polyethylene glycol (MW 600)* | 1,398 | 7 |
| 15 | Polyethylene glycol (MW 1500)* | 2,868 | 12 |
| 16 | 1,2-Propylene glycol | 646 | 5 |
| 17 | 1,3-Propylene glycol | 988 | 8 |
| 18 | Dipropylene glycol | 476 | 3 |
| 19 | Polypropylene glycol (MW 425)* | 835 | 3.6 |
| 20 | Polypropylene glycol (MW 1000)* | 1,684 | 6 |
| 21 | Polypropylene glycol (MW 2000)* | 2,456 | 4 |
| 22 | Hexylene glycol | 916 | 7 |
| 23 | 2-Ethyl-1,3-hexanediol | 602 | 4 |
| 24 | 1,5-Pentanediol | 446 | 3 |
| 25 | 1,4-Cyclohexanediol | 629 | 4.5 |
| 26 | 1,3-Bis(hydroxyethyl)-benzene | 736 | 5 |
| 27 | Glycerol | 548 | 4. |
| 28 | 1,2,6-Hexanetriol | 476 | 3 |
| 29 | Trimethylolpropane | 590 | 4 |
| 30 | Trimethylolpropane | 750 | 5.4 |
| 31 | Trimethylolpropane | 1,103 | 8.5 |
| 32 | Triethanolamine | 890 | 6.5 |
| 33 | Erythritol | 920 | 7 |
| 34 | Pentaerythritol | 1,219 | 9.5 |

*Average molecular weight of glycol.

The structures of the compounds in the above tabulation are obvious to one skilled in the art based on the information given. The structure of compound No. 7 is:

wherein the variable r is an integer, the sum of r+r has an average value of 3.7 and the average molecular weight is 527. The structure of compound No. 20 is:

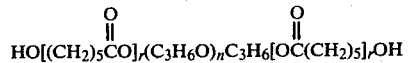

wherein the sum of r+r has an average value of 6 and the average molecular weight is 1,684. This explanation makes explicit the structural formulas of compounds 1 to 34 set forth above.

As previously indicated, the type A polycaprolactone polyols are used as intermediates in the production of the Type B, Type C and Type D polycaprolactone derivatives. In producing these three latter types, the polycaprolactone polyol is reacted with a polycarboxylic acid anhydride. Illustrative thereof one can mention trimellitic anhydride, tetrahydrophthalic anhydride, phthalic anhydride, benzophenone dicarboxylic acid anhydride, succinic anhydride, maleic anhydride, naphthoic anhydride, glutaric anhydride, or any other intramolecular anhydride, including those having substituents thereon such as halogen atoms, alkyl or alkoxy groups, nitro, carboxyl, aryl, or any other group which will not unduly interfere with the reaction.

For the preparation of the Type B carboxyl modified polycaprolactone adducts the amount of polycarboxylic acid anhydride reacted with the polycaprolactone polyol can be an amount sufficient to permit reaction with all of the hydroxyl groups; however, it is preferred to use an amount which is insufficient to react with all of the hydroxyl groups present in the polycaprolactone polyol. This amount will vary and can be from 0.1 to 1 anhydride equivalent for each hydroxyl equivalent or group present in the polycaprolactone polyol initially charged to the reaction mixture and is preferably from 0.1 to 0.4. In a most preferred instance, one anhydride equivalent or anhydride moiety is charged for each nine hydroxyl equivalents or groups initially present in the reaction mixture.

The polycaprolactone polyols are reacted with the polycarboxylic acid anhydride at a temperature of about 75° to 200° C., preferably about 100° to 160° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 175° C. is adequate to produce the initial water insoluble carboxyl modified oligomer addition reaction product obtained by the reaction of these two intermediates.

The water insoluble adduct formed at this stage of the reaction is a viscous liquid in most instances. However, in some instances it has been observed that the product will solidify upon standing at room temperature for an extended period of time. This, however, does not detract from its further utility. Generally these modified oligomer or adducts are water insoluble but solvent soluble.

For the preparation of the Type C carboxyl modified polycaprolactone urethane adducts, the abovedefined polycaprolactone polyols and anhydrides are used in conjunction with a polyisocyanate.

The polyisocyanates that can be used in this invention are well known to those skilled in the art and should not require detailed description herein. Any of the polyisocyanates can be used alone or in admixture with other isocyanates including the monoisocyanates. Illustrative thereof one can mention methyl isocyanate, ethyl isocyanate, chloroethyl isocyanate, chloropropyl isocyanate, chlorohexyl isocyanate, chlorobutoxypropyl isocyanate, hexyl isocyanate, phenyl isocyanate, the o-, m-, and p-chlorophenyl isocyanates, benzyl isocyanate, naphthyl isocyanate, o-ethylphenyl isocyanate, the dichlorophenyl isocyanates, methyl isocyanate, butyl isocyanate, n-propyl isocyanate, octadecyl isocyanate, 3,5,5-trimethyl-1-isocyanato-3-isocyanatomethylcyclohexane, di(2-isocyanatoethyl)-bicyclo(2.2.1)-hept-5-ene-2,3-dicarboxylate, 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanate diphenyl ether, 2,4,6-triisocyanate toluene, 4,4',4''-triisocyanate triphenyl methane, diphenylene-4,4'-diisocyanate, the polymethylene polyphenylisocyanates, as well as any of the other organic isocyanates known to the average skilled chemist.

The amount of isocyanate used can be an amount sufficient to permit reaction of the isocyanato group with up to about 0.9 equivalent of the total number of hydroxyl equivalents present. Thus, from 0.025 to 0.9 isocyanato equivalent is reacted per hydroxyl equivalent, preferably from 0.04 to 0.5 isocyanato equivalent per hydroxyl equivalent, and most preferably from 0.04 to 0.25 isocyanato equivalent per hydroxyl equivalent initially charged.

The amount of polycarboxylic acid anhydride reacted with the polycaprolactone polyol can be an amount sufficient to react with all the residual unreacted hydroxyl groups; however, it is preferred to use an amount which is insufficient to react with all of the residual hydroxyl groups present in the polycaprolactone polyol after its reaction with the isocyanate. This amount will vary and can be from 0.1 to 1 anhydride equivalent for each unreacted hydroxyl equivalent or group present in the polycaprolactone derivative in the reaction mixture. It is preferably from 0.1 to 0.4 and, in a most preferred instance, one anhydride equivalent or anhydride moiety is charged for each nine unreacted hydroxyl equivalents or groups present in the reaction mixture.

The reaction temperature when this isocyanate derivative is initially reacted with this polycaprolactone polyol can be from about room temperature to about 75° C. The temperature is then raised when this urethane derivative is subsequently reacted with the polycarboxylic acid anhydride and this temperature is the same as that which is used when all three components are initially charged together. The reaction of any mixture with the anhydride is carried out at a temperature of from about 75° to 200° C., preferably from about 100° to 140° C. The time required for reaction will vary depending upon the particular reactants charged, the temperature and the batch size of the reaction mixture, facts which are well known to those skilled in the art. Generally it has been found that a reaction period in the laboratory of from 15 to 45 minutes at from about 125° to 150° C. is adequate to produce the initial water insoluble carboxyl modified urethane oligomer addition reaction product obtained by the reaction of these intermediates.

The water insoluble urethane adduct formed at this stage of the reaction is a viscous liquid in most instances. However, in some instances the product may solidify upon standing for an extended period of time. This, however, does not detract from its further utility. Generally these carboxy modified urethane oligomers or adducts are water insoluble but solvent soluble.

For the preparation of the Type D carboxyl modified polycaprolactone-epoxide adducts, the above defined polycaprolactone polyols and anhydrides are used in conjunction with a diepoxide.

The diepoxides that can be used in this invention are well known to those skilled in the art and are fully described in U.S. Pat. No. 3,027,357, U.S. Pat. No. 2,890,194 and U.S. Pat. No. 2,890,197. Of particular interest is that portion of U.S. Pat. No. 3,027,357 beginning at column 4, line 11 to column 7, line 38, which portion and disclosure is specifically incorporated herein by reference. Among some of the specific illustrative diepoxides disclosed therein one can mention 3,4-epoxycyclohexylmethyl-3,4-epoxycyclohexane carboxylate, bis(3,4-epoxy-6-methylcyclohexylmethyl) adipate, bis(2,3-epoxy-cyclopentyl) ether, vinyl cyclohexene dioxide, 2-(3,4-epoxycyclohexyl)-5,5-spiro-(2,3-epoxy-cyclohexane)-m-dioxane, bis(3,4-epoxycyclohexylmethyl) adipate, and the like.

The amount of polycarboxylic acid anhydride reacted with the polycaprolactone polyol is an amount which is insufficient to react with all of the hydroxyl groups initially present in the polycaprolactone polyol or formed in the polycaprolactone-epoxide adduct. This amount will vary and can be from 0.1 to about 0.5 anhydride equivalent for each unreacted hydroxyl equivalent or group present in the polycaprolactone portion of the reaction mixture.

The reactions are conducted at a temperature of from about 75° to 200° C., preferably from about 100° to 160° C. The time required for reaction will vary depending upon the particular reactants charged, the temperature and the batch size of the reaction mixture, facts which are well known to those skilled in the art. Generally it has been found that a reaction period in the laboratory of from 15 to 120 minutes at from about 125° to 175° C. is adequate to produce the initial water insoluble carboxyl modified polycaprolactone-epoxide oligomer addition reaction product obtained by the reaction of the intermediates.

The water insoluble polycaprolactone-epoxide adduct formed at this stage of the reaction is a viscous liquid in most instances. However, in some instances the product may solidify upon standing for an extended period of time. This, however, does not detract from its further utility. Generally these modified polycaprolactone-epoxide oligomers or adducts are water insoluble but solvent soluble.

While applicants have not fully established the structures of the Type B, Type C and Type D adducts, it has been theorized that the reactions can proceed along the following route:

Type B Reaction Scheme

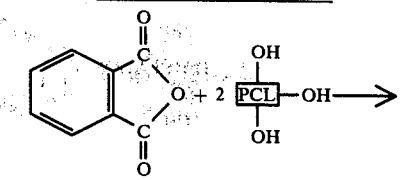

-continued
Type B Reaction Scheme

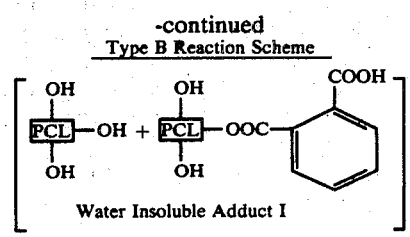

Water Insoluble Adduct I

Type C Reaction Scheme
Step 1

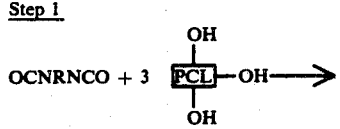

-continued
Type C Reaction Scheme

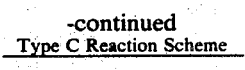

Water Insoluble Urethane Adduct I

Step 2

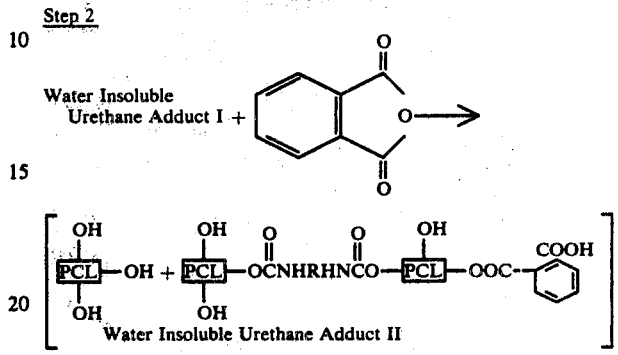

Water Insoluble Urethane Adduct I +

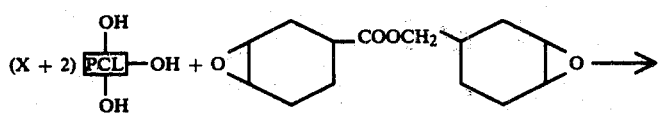

Water Insoluble Urethane Adduct II

Type D Reaction Scheme

Route 1
Step 1

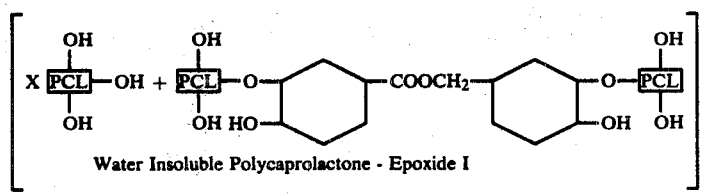

Water Insoluble Polycaprolactone - Epoxide I

Step 2

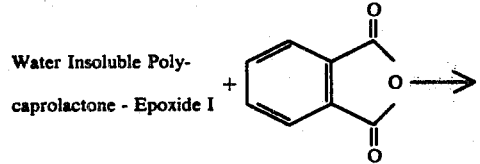

Water Insoluble Poly-caprolactone - Epoxide I +

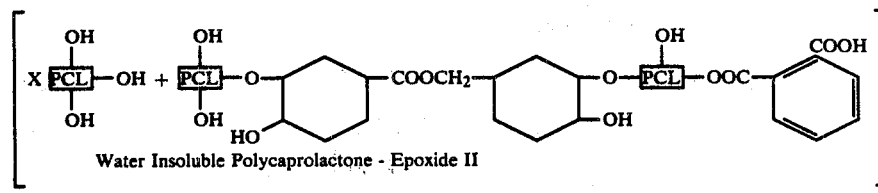

Water Insoluble Polycaprolactone - Epoxide II

Route 2
Step 1

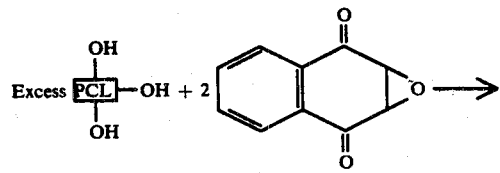

Excess PCL—OH + 2

-continued
Type D Reaction Scheme

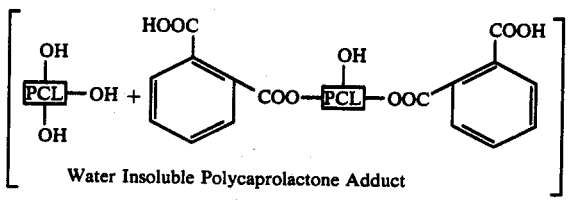

Water Insoluble Polycaprolactone Adduct

Step 2

Water Insoluble Polycaprolactone Adduct +

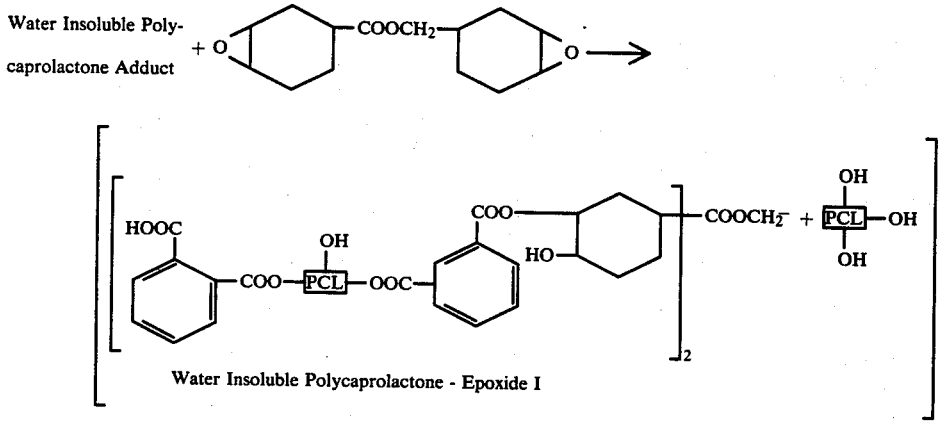

Water Insoluble Polycaprolactone - Epoxide I

In the above reaction schemes the unit

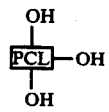

represents a polycaprolactone triol, OCNRNCO represents a diisocyanate and X is an integer having a value of 0 to 4. While this theoretical explanation is presented, applicants do not intend to be bound by any theory.

In a typical reaction for the production of the Type B adducts one normally charges a polycaprolactone polyol and the polycarboxylic acid anhydride to a reaction vessel and heats the mixture to a temperature of from about 125° to 175° C. for a period of about 20 to 30 minutes. This produces a water insoluble carboxyl modified polycaprolactone oligomer or adduct.

In a typical embodiment for the production of the Type C adducts one can react the polycaprolactone polyol and the polyisocyanate at a temperature up to about 75° C. and then add the carboxylic acid anhydride and react at 75° C. to 200° C. to produce the water insoluble methane adduct. In a second embodiment all of the reactants are initially charged together and the reaction is heated and completed at a temperature of from 75° C. to 200° C.

It is customary to use any of the known urethane-forming reaction catalysts during the isocyanate reaction with the polyol. These are well known and any of the catalysts can be used. Illustrative thereof are dibutyltin dilaurate, stannous octoate, triethylenediamine, triethylamine, the known tin salt catalysts, and the like.

In a typical embodiment for the production of the Type D adducts according to Route I, one can react the polycaprolactone polyol with the diepoxide at the indicated temperature to produce the Water Insoluble Polycaprolactone-Epoxide I or variants thereof. In some instances one may wish to react up to two of the hydroxyl on each polycaprolactone triol. This intermediate compound is then reacted in Step 2 with a carboxylic acid anhydride to form the second Water Insoluble Polycaprolactone-Epoxide II shown above.

In a typical embodiment according to Route II, one can initially react the polycaprolactone polyol with a carboxylic acid anhydride to obtain the Water Insoluble Polycaprolactone Adduct shown in Step 1. This derivative is then reacted, as shown in Step 2, with the diepoxide to produce the Water Insoluble Polycaprolactone-Epoxide Adduct I.

In the schematics shown above specific ratios and compounds were employed for illustrative purposes only. It is apparent, in view of our complete description, that these can be modified within the ranges disclosed in this application. The Types B, C and D water insoluble adducts shown above are generally neutralized with an inorganic or organic base to a pH of from about 7 to 9. The preferred bases are the organic amines such as butylamine, morpholine, triethylamine, diethylamine, or any other known amine with the preferred being the tertiary amines.

As is known, catalysts are used during the reaction of the diepoxide with the carboxyl group. The suitable catalysts for use in this invention are those conventionally used and the amounts are also known to those skilled in the art. Illustrative thereof one can mention stannous octoate, benzildimethylamine, tris(dimethylaminomethyl)phenol, triethylenediamine, tributylphosphine, triethylamine, uranyl nitrate hexahydrate, and the like.

The high solids coatings compositions of this invention contain a methylolated melamine. These compounds are well known and many are available commercially. Those suitable for use can be represented by the general formula:

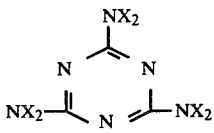

wherein X is hydrogen or —CH₂OCH₃ and wherein at least two of the X substituents are —CH₂OCH₃ groups. The preferred melamine derivatives are the highly methylolated melamines, with hexamethoxymethylmelamine most preferred. Other amino resins that can be used include the urea and benzoguanamine resins.

The third necessary component for the compositions of this invention is a non-volatile low molecular weight polyol containing from 2 to 6, preferably 2 to 4 hydroxyl groups. These non-volatile low molecular weight polyols can have a molecular weight of from 62 to about 1000. They can be aliphatic, cycloaliphatic or aromatic in nature. Illustrative thereof one can mention ethylene glycol, diethylene glycol, triethylene glycol, propylene glycol, dipropylene glycol, neopentyl glycol, butylene glycol, 2,2-dimethyl-3-hydroxypropyl 2,2-dimethyl-3-hydroxypropionate, 2,3-dibromo-1,4-but-2-ene diol, bisphenol-A and the ethylene oxide and/or propylene oxide adducts thereof, 2,2-dihydroxymethylpropionic acid, trimethylol ethane, trimethylol propane, pentaerythritol, dipentaerythritol, glycerine, sorbitol, hydrogenated bisphenol-A; 1,1-dihydroxy methane cyclohexane, 2,2'-dihydroxymethylbicyclo [2.2.1]heptane, 1,5-pentane diol, decane diol, and the like. Many other non-volatile low molecular weight diols having a molecular weight of from 62 to about 1000 are known and can be used; the above enumeration is illustrative only.

The concentration of the polycaprolactone derivative of Types A to D in the high solids coatings compositions of this invention can be from 20 to 80 weight percent, preferably from 25 to 50 weight percent, and most preferably from 30 to 35 weight percent of the total weight of said derivative plus combined mix, as the term combined mix is hereafter defined.

The term "combined mix" defines the mixture of the methylolated melamine compounds plus the low molecular weight polyol compounds hereinbefore defined. The concentration of said combined mix in the high solids coatings compositions of this invention can be from 80 to 20 weight percent, preferably from 75 to 50 weight percent and most preferably from 70 to 65 weight percent of the total weight of polycaprolactone derivative plus combined mix. In this combined mix the concentration of the methylolated melamine is from 40 to 90 weight percent, preferably from 50 to 75 weight percent based on the weight of the combined mix.

The coating compositions can also contain an organic solvent and a catalyst as optional components. Any of the conventional solvents used in the coatings industry can be used at a concentration preferably below 30 weight percent of the total weight of the coating composition. While larger amounts could conceivably be used, the use of larger amounts would destroy the high solids nature of the coating; solvents are generally added in the small amounts indicated to improve flowability during application of the coating composition to the substrate.

In some instance an acid catalyst might be desired to improve the efficiency of the melamine crosslinking reaction during curing. The concentration of the catalyst can vary from zero to about 10 weight percent based on the total weight of the coating composition. The particular catalyst used and its concentration are dependent to a degree upon its catalytic activity and the specific components present in the coatings composition. These catalysts are known to those skilled in the art and include hydrochloric acid, sulfuric acid, p-toluene sulfonic acid, dodecylbenzene sulfonic acid, phosphoric acid and its alkyl derivatives, maleic acid, trimellitic acid, phthalic acid, succinic acid, and the like.

The coatings compositions can also contain pigments, fillers, and other additives conventionally present in coatings compositions in their conventional quantities. The particular ones selected are of no consequence to the basic invention. In preparing the coatings compositions, the ingredients are mixed by the conventional procedures used in the production of paints, inks or coatings compositions. These procedures are so well known to those skilled in the art that they do not require further discussion here.

The coatings compositions are applied to a surface or substrate by conventional means and then thermally cured by heating at a temperature of about 125° to 250° C., preferably from 150° to 200° C. for a period of time sufficient to obtain a dry film. Generally, this time will range from about one to 30 minutes, preferably from 10 to 20 minutes. The components present in a particular high solids coating composition will determine the temperature and time that will be required to obtain an adequate cure and a good film coating.

The coatings compositions of this invention are high solids coatings compositions and they can contain as much as 90 weight percent or more solids therein. Generally the total solids content of the coatings compositions of this invention range from about 70 to 90 weight percent of the total weight of the coating composition.

The coatings compositions were evaluated according to the following procedures. Crosshatch adhesion refers to a test using 10 parallel single edge razor blades to scribe test films with 2 sets of perpendicular lines on a crosshatch pattern. Ratings are based on the amount of film removed after applying and subsequent pulling a contact adhesive tape away (Scotch Brand 606) from the surface of the scribed coating at a 90 degree angle in a fast rapid movement. It is important to carefully apply and press the tape to the scribed coating to eliminate air bubbles and provide a good bond because adhesion is reported in percent of film remaining on the substrate with a 100 percent rating indicating complete adhesion of the film to the substrate.

Solvent resistance is a measure of the resistance of the cured film to attack by acetone and is reported in the number of rubs or cycles of acetone soaked cheesecloth required to remove one half of a film from the test area. The test is performed by stroking the film with an acetone soaked cheesecloth until that amount of film coating is removed. The number of cycles required to remove this amount of coating is a measure of the coating solvent resistance.

Reverse impact measures the ability of a given film to resist rupture from a falling weight. A Gardner Impact Tester using an eight pound dart is used to test the films cast and cured on the steel panel. The dart is raised to a given height in inches and dropped on to the reverse side of a coated metal panel. The inches times pounds, designated inch-pound, absorbed by the film without rupturing is recorded as the films reverse-impact-resistance.

In this application the following definitions describe the particular compounds that are used in the examples:

Silicone Surfactant I is

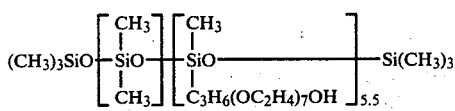

Polyol A is a polycaprolactone diol having an average molecular weight of 530 and an average hydroxyl number, measured in milligrams of potassium hydroxide per gram, of 212.

Polyol B is a polycaprolactone diol having an average molecular weight of 830 and an average hydroxyl number of 135.

Polyol C is a polycaprolactone diol having an average molecular weight of 1,250 and an average hydroxyl number of 90.

Polyol D is a polycaprolactone diol having an average molecular weight of 2,000 and an average hydroxyl number of 56.

Polyol E is a polycaprolactone triol having an average molecular weight of 540 and an average hydroxyl number of 310.

Polyol F is the reaction product of a mixture of Polyol E and a polycaprolactone triol having an average molecular weight of 300 and an average hydroxyl number of 560 reacted with 3,4-epoxycyclohexane carboxylate, said Polyol F having a hydroxyl number of 340 and an average molecular weight of about 900.

Polyol G is a polycaprolactone triol having an average molecular weight of 300 and an average hydroxyl number of 560.

The following examples further serve to define this invention.

EXAMPLE 1

A coating composition was prepared containing 8 grams of Polyol E, 1 gram of hexamethoxymethylmelamine having less than about 0.5 weight percent methylol groups, 1 gram of trimethylolpropane, 5 grams of methyl ethyl ketone and 0.02 gram of para-toluenesulfonic acid. The mixture was mixed until homogeneous and the coating was applied on steel panels using a No. 40 wire wound rod. The coating was cured at 350° F. for 5 minutes and the dry film had good gloss and reverse impact resistance, solvent resistance was poor when exposed to acetone.

EXAMPLES 2 TO 6

In this series of examples coating formulations were produced containing the components described in the table below. In addition, twenty parts of methyl ethyl ketone per hundred parts of solids were added in preparing the liquid formulation. These coatings were applied to steel panels using a No. 60 wire wound rod and they were cured at 350° F. for 5 minutes. The formulations in weight percentages and the properties of the dry film coatings are set forth below. The formulations contained 0.4 weight percent of a mixture of methyldiethanol amine and para-toluenesulfonic acid in 50 percent isopropanol as catalyst.

| Example | 2 | 3 | 4 | 5 | 6 |
|---|---|---|---|---|---|
| Polyol B | 76 | 41 | 33 | 28 | 24 |
| Hexamethoxymethyl-melamine | 24 | 39 | 42 | 44 | 46 |
| *Esterdiol-204 | 0 | 20 | 25 | 28 | 30 |
| Sward hardness glass = 100% | 12 | 14 | 18 | 30 | 30 |
| Reverse impact, in.lb. | 25 | 125 | 200 | 125 | 25 |

*2,2-dimethyl-3-hydroxypropyl 2,2-dimethyl-3-hydroxypropionate

The data indicate that hardness of the coating film increases as the concentrations of hexamethoxymethylmelamine and the Esterdiol-204 increase. It also indicates that impact resistance properties are optimized at a polycaprolactone polyol concentration in the range of 30 to 35 weight percent.

EXAMPLES 7 TO 11

A series of coating compositions was produced having the formulations described in the following table. In these formulations the catalyst was the same used in Examples 2 to 6. In addition, 20 parts of toluene per hundred parts of solids was added in preparing the liquid coating compositions. These coating compositions were applied to steel panels using a No. 40 wire wound rod and cured at 350° F. for 5 minutes. The properties of the coatings are also set forth below.

| Example | 7 | 8 | 9 | 10 | 11 |
|---|---|---|---|---|---|
| Polyol A, g | 58 | 42 | 36 | 31 | 24 |
| Hexamethoxymethyl-melamine, g. | 42 | 42 | 44 | 45 | 48 |
| Esterdiol-204, g. | 0 | 16 | 20 | 24 | 28 |
| Sward hardness, glass = 100% | 10 | 12 | 14 | 26 | 26 |
| Reverse impact, in.lb. | 75 | 125 | 150 | 100 | 15 |

The coated films had good adhesion and solvent resistance properties. Again it was observed that reverse impact properties were at a maximum when approximately 35 weight percent of the polycaprolactone polyol was present in the coating composition.

EXAMPLE 12

A coating composition was produced containing 16.3 grams of Polyol C, 20.4 grams of hexamethoxymethylmelamine, 13.3 grams of Esterdiol-204 and 0.5 gram of the catalyst used in Examples 2 to 6. This coating composition was applied to steel panels using a No. 40 wire wound steel rod and curved at 350° F. for 5 minutes. There was produced a smooth, glossy, dry film having a Sward hardness of 20 and a reverse impact of 125 in.lb.

EXAMPLE 13

A coating composition was produced containing 16.6 grams of Polyol D, 19.7 grams of hexamethoxymethylmelamine, 13.7 grams of Esterdiol-204 and 0.5 gram of the same catalyst used in Examples 2 to 6. This coating formulation was applied to steel panels using a No. 40 wire wound rod and cured at 350° F. for 5 minutes. The dry film had a Sward hardness of 22 and a reverse impact resistance of 150 in.lbs.

EXAMPLE 14

A coating composition was produced containing 46.5 grams of Polyol B, 36.5 grams of hexamethoxymethylmelamine, 15.7 grams of dimethanol tricyclodecane, 40 grams of titanium dioxide, 2 grams of a 50 percent isopropanol solution of a mixture of methyl diethanolamine and para-toluenesulfonic acid, 20 grams of methyl isobutyl ketone and 0.1 gram of Silicone Surfactant I. This mixture was rolled in a ball mill overnight to produce a white coating composition that was sprayed on to steel panels and cured at 350° F. for 5 minutes. The dry film was glossy, flexible and of good impact.

EXAMPLE 15

A reaction flask equipped with a stirrer, thermometer and nitrogen inlet tube was charged with 1,200 grams of Polyol E, 1,200 grams of Polyol G and 600 grams of phthalic anhydride. The mixture was heated under nitrogen for 60 minutes at 140° C. An amber colored, viscous liquid having an acid number of 78 mgm KOH/gram was obtained that was neutralized to a pH of 8.2 with 378 grams of N,N-dimethyl ethanolamine.

A 6.8 grams portion of the neutralized carboxyl modified polycaprolactone adduct reaction product mixture was blended with 10.6 grams of hexamethoxymethylmelamine, 2.6 grams of 2,2-dimethyl-3-hydroxypropyl 2,2-dimethyl-3-hydroxypropionate and 5 grams of butyl acetate as solvent to produce a coating composition. This high solids coating composition was applied to a steel panel using a No. 60 wire wound rod and cured at 350° F. for 20 minutes to yield a smooth, glossy, dry film having good acetone resistance properties.

EXAMPLE 16

A reaction flask, as described in Example 15, was charged with 300 grams of Polyol G and 0.35 gram of dibutyltin dilaurate. After heating to 50° C., 30 grams of hydrogenated tolylene diisocyanate were added in a dropwise manner. Then 58 grams of phthalic anhydride were added and the mixture was heated under nitrogen at 130° C. for 30 minutes. An amber colored, viscous liquid having an acid number of 57 mgm KOH/gram was obtained that was neutralized with 32.6 grams of N,N-dimethyl ethanolamine.

A 6.8 grams portion of the neutralized carboxyl modified polycaprolactone urethane adduct reaction product mixture was blended with 10.6 grams of hexamethoxymethylmelamine, 2.6 grams of 2,2-dimethyl-3-hydroxypropyl 2,2-dimethyl-3-hydroxypropionate and 5 grams of butyl acetate as solvent. This high solids coating composition was applied to a steel panel using a No. 60 wire wound rod and cured at 350° F. for 20 minutes to yield a smooth, glossy, dry film having good acetone resistance properties.

EXAMPLE 17

A reaction flask, as described in Example 15, was charged with 360 grams of Polyol F and 40 grams of phthalic anhydride. After heating at 130° F. for 30 minutes an amber colored, viscous liquid having an acid number of 39 mgm KOH/gram was obtained; this was neutralized with 25 grams of morpholine.

A 6.8 grams portion of the neutralized carboxyl modified polycaprolactone adduct reaction product mixture was blended with 10.6 grams of hexamethoxymethylmelamine, 2.6 grams of 2,2-dimethyl-3-hydroxypropyl 2,2-dimethyl-3-hydroxypropionate and 5 grams of butyl acetate as solvent. This high solids coating composition was applied to a steel panel using a No. 60 wire wound rod and cured at 350° F. for 20 minutes to yield a smooth, glossy, dry film having good resistance to acetone.

EXAMPLE 18

A coating composition was produced containing 6.8 grams of Polyol F, 10.6 grams of hexamethoxymethylmelamine, 2.6 grams of 2,2-dimethyl-3-hydroxypropyl 2,2-dimethyl-3-hydroxypropionate, 5 grams of butyl acetate, 0.4 gram of maleic anhydride and 0.4 gram of N,N-dimethyl ethanolamine. This high solids coating composition was applied to a steel panel using a No. 60 wire wound rod and cured at 350° F. for 20 minutes to yield a smooth, glossy, dry film having good resistance to acetone.

EXAMPLE 19

A coating composition was produced containing 5.6 grams of the neutralized carboxyl modified polycaprolactone adduct reaction product mixture of Example 15, 8.4 grams of hexamethoxymethylmelamine, 6 grams of the adduct diol reaction product of 3 moles of ethylene oxide with one mole of 2,2-bis(4-hydroxyphenyl)propane and 5 grams of butyl acetate. This high solids coating composition was applied to a steel panel using a No. 60 wire wound rod and cured at 350° F. for 20 minutes to yield a smooth, glossy, dry film having good acetone resistance.

What we claim is:

1. A high solids composition comprising from (I) 20 to 80 weight percent of a polycaprolactone derivative and (II) from 80 to 20 weight percent of a combined mix; wherein said combined mix (II) is a mixture of a methylolated melamine and a non-volatile low molecular weight polyol having a molecular weight of from 62 to about 1000 and from 2 to 6 hydroxyl groups wherein the methylolated melamine comprises from 40 to 90 weight percent of said combined mix; and wherein said polycaprolactone derivative (I) is a carboxyl modified polycaprolactone urethane adduct reaction product mixture of (i) a polycaprolactone polyol, (ii) from 0.025 to 0.9 isocyanato equivalent for each initial hydroxyl equivalent present in the polycaprolactone of an organic polyisocyanate and (iii) from 0.1 to 1 carboxylic anhydride equivalent per each unreacted hydroxyl equivalent present of an intramolecular anhydride of a polycarboxylic acid.

2. A high solids composition as claimed in claim 1, wherein said polycaprolactone polyol in said polycaprolactone derivative has from 2 to 6 hydroxyl groups.

3. A high solids composition as claimed in claim 1, wherein said polycaprolactone polyol in said polycaprolactone derivative has from 2 to 4 hydroxyl groups.

4. A high solids composition as claimed in claim 1, wherein said polycaprolactone polyol in said polycaprolactone derivative has an average molecular weight of from 290 to about 3,000.

5. A high solids composition as claimed in claim 1, wherein said polycaprolactone polyol in said polycaprolactone derivative has from 290 to 500 hydroxyl groups.

6. A high solids composition as claimed in claim 1, wherein said polycaprolactone polyol in said polycaprolactone derivative is a triol having an average molecular weight of from about 300 to 1,000.

7. A high solids composition as claimed in claim 1, wherein said polycaprolactone polyol in said polycaprolactone derivative is a mixture of polycaprolactone polyols.

8. A high solids composition as claimed in claim 1, wherein said anhydride is phthalic anhydride.

9. A high solids composition as claimed in claim 1, wherein (I) is present at a concentration of from 25 to 50 weight percent and (II) is present at a concentration of from 75 to 50 weight percent, based on the combined weights of (I) and (II).

10. A high solids composition as claimed in claim 1, wherein (I) is present at a concentration of from 30 to 35 weight percent and (II) is present at a concentration of from 70 to 65 weight percent, based on the combined weights of (I) and (II).

11. A high solids composition as claimed in claim 1, wherein the methylolated melamine in combined mixture (II) is hexamethoxymethylmelamine.

12. A high solids composition as claimed in claim 1, wherein
  (a) the polycaprolactone polyol (i) used to produce component (I) is a polycaprolactone triol having an average molecular weight of 540 and an average hydroxyl number of 310; and
  (b) component (II) is a combined mix of hexamethoxymethylmelamine and trimethylolpropane.

13. A high solids composition as claimed in claim 1, wherein
  (a) the polycaprolactone polyol (i) used to produce component (I) is a polycaprolactone diol having an average molecular weight of 830 and an average hydroxyl number of 135; and
  (b) component (II) is a combined mix of hexamethoxymethylemlamine and 2,2-dimethyl-3-hydroxypropyl 2,2-dimethyl-3-hydroxypropionate.

14. A high solids composition as claimed in claim 1, wherein
  (a) the polycaprolactone polyol (i) used to produce component (I) is a polycaprolactone diol having an average molecular weight of 530 and an average hydroxyl number of 212; and
  (b) component (II) is a combined mix of hexamethoxymethylmelamine and 2,2-dimethyl-3-hydroxypropyl 2,2-dimethyl-3-hydroxypropionate.

15. A high solids composition as claimed in claim 1, wherein
  (a) the polycaprolactone polyol (i) used to produce component (I) is a polycaprolactone diol having an average molecular weight of 1,250 and an average hydroxyl number of 90; and
  (b) component (II) is a combined mix o hexamethoxymethylmelamine and 2,2-dimethyl-3-hydroxypropyl 2,2-dimethyl-3-hydroxypropionate.

16. A high solids composition as claimed in claim 1, wherein:
  (a) the polycaprolactone polyol (i) used to produce component (I) is a polycaprolactone diol having an average molecular weight of 2,000 and an average hydroxyl number of 56; and
  (b) component (II) is a combined mix of hexamethoxymethylmelamine and 2,2-dimethyl-3-hydroxypropyl 2,2-dimethyl-3-hydroxypropionate.

17. A high solids composition as claimed in claim 1, wherein
  (a) the polycaprolactone polyol (i) used to produce component (I) is a polycaprolactone diol having an average molecular weight of 830 and an average hydroxyl number of 135; and
  (b) component (II) is a combined mix of hexamethyoxymethylmelamine and dimethanol tricyclodecane.

* * * * *